United States Patent
Jeong et al.

(10) Patent No.: US 7,706,841 B2
(45) Date of Patent: Apr. 27, 2010

(54) APPARATUS AND METHOD FOR TRANSMITTING WIRELESS LAN INFORMATION IN MOBILE COMMUNICATION NETWORK FOR WIRELESS LAN INTERWORKING

(75) Inventors: Kyeong-In Jeong, Suwon-si (KR); Kook-Heui Lee, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 331 days.

(21) Appl. No.: 11/202,029

(22) Filed: Aug. 12, 2005

(65) Prior Publication Data
US 2006/0034236 A1 Feb. 16, 2006

(30) Foreign Application Priority Data
Aug. 14, 2004 (KR) ............ 10-2004-0064134

(51) Int. Cl.
H04M 1/00 (2006.01)
H04W 40/00 (2009.01)
H04B 7/212 (2006.01)

(52) U.S. Cl. ............... 455/562.1; 455/446; 455/432.3; 370/347

(58) Field of Classification Search ............. 370/338; 455/435.1, 435.2, 436, 439, 448, 444
See application file for complete search history.

(56) References Cited

U.S. PATENT DOCUMENTS 6,243,581 B1 * 6/2001 Jawanda ............... 455/432.2
7,006,481 B2 * 2/2006 Terry .................... 370/338
7,260,079 B1 * 8/2007 Chapman et al. .......... 370/338
2002/0159431 A1 * 10/2002 Moulsley et al. .......... 370/347
2003/0118015 A1 * 6/2003 Gunnarsson et al. ....... 370/389
2004/0037258 A1 * 2/2004 Scherzer et al. .......... 370/338
2005/0213538 A1    9/2005 Ebiko et al.

FOREIGN PATENT DOCUMENTS

JP    2002-262351 A    9/2002
JP    2003-69469 A     3/2003

(Continued)

OTHER PUBLICATIONS

3GPP: "Universal Mobile Telecommunications System (UMTS); Physical Channels and Mapping of Transport Channels Onto Physical Channels (FDD) 3GPP TS 25.211 Version 6.1.0 Release 6); ETSI TS 125 211" ETSI Standards, *European Telecommunications Standards Institute*, Sophia- Antipo, Fr. vol. 3-RI, No. V610, Jun. 2004 XP014016683.

*Primary Examiner*—Nick Corsaro
*Assistant Examiner*—Joel Ajayi
(74) *Attorney, Agent, or Firm*—Roylance, Abrams, Berdo & Goodman, L.L.P.

(57) ABSTRACT

An apparatus and a method are provided for transmitting wireless local area network (WLAN) information in a mobile communication network for WLAN-interworking. The method includes the steps of setting a WLAN threshold value, which is used for determining if a WLAN area is present in a cell, and a measurement period in system information, broadcasting the system information in the cell, and transmitting a common pilot channel, which indicates that the WLAN area is present in the cell, in a predetermined direction with predetermined transmission power to cover the WLAN area by using beam forming.

13 Claims, 6 Drawing Sheets

FOREIGN PATENT DOCUMENTS

| | | |
|---|---|---|
| JP | 2003-110496 A | 4/2003 |
| JP | 2004-7279 A | 1/2004 |
| WO | WO 00/55986 | 9/2000 |
| WO | WO 03/054721 | 7/2003 |
| WO | WO 2004/002051 A2 | 12/2003 |
| WO | WO 2004/006448 A2 | 1/2004 |
| WO | WO 2004/006482 | 1/2004 |
| WO | WO 2004/079949 | 9/2004 |

* cited by examiner

APPARATUS AND METHOD FOR TRANSMITTING WIRELESS LAN INFORMATION IN MOBILE COMMUNICATION NETWORK FOR WIRELESS LAN INTERWORKING

PRIORITY

This application claims the benefit under 35 U.S.C. 119(a) of a Korean Patent Application entitled "Apparatus And Method For Transmitting Wireless LAN Information In Mobile Communication Network For Wireless LAN Interworking", filed with the Korean Intellectual Property Office on Aug. 14, 2004 and assigned Serial No. 2004-64134, the entire contents of which are hereby incorporated by reference.

BACKGROUND OF THE INVENTION

1. Field of the Invention

The present invention relates to interworking between a mobile communication network and a wireless local area network (WLAN). More particularly, the present invention relates to an apparatus and a method for transmitting WLAN information in a mobile communication network.

2. Description of the Related Art

Recently, as portable electronic appliances including portable computers and mobile phones have been rapidly developed, many studies and research have been performed in relation to wireless access schemes for a wired network, such as an Intranet, the Internet or the World Wide Web (WWW). A wireless local area network (WLAN) is known as a technology to access the wired network at a high rate with a low cost. In addition, $3^{rd}$ generation mobile communication systems, such as the code division multiple access (CDMA) 2000, the wideband code division multiple access/universal mobile telecommunications system (WCDMA/UMTS), the general packet radio system (GPRS) or the evolution data and voice (1xEV-DV), may attain high rate data transmission through wireless channels so that the mobile station or user equipment can access the packet communication network, such as the Internet, through a cellular mobile communication network.

However, such advancements may cost a lot in wireless access technologies. For this reason, studies and research are currently focused on interworking terminals capable of accessing both the mobile communication network and the WLAN in order to attain interworking between the mobile communication network and the WLAN. The main purpose of the interworking is to provide services of the mobile communication network by using the WLAN, which is a mass storage network constructed at a low cost.

Differently from the mobile communication network, the IEEE 802.11 WLAN does not use a paging channel for tracking accessible network nodes, that is, access points. An operation of an IEEE 802.11 interworking terminal for detecting the access points is called a "scan". The scan scheme of the WLAN may be divided into an active scan and a passive scan. According to the active scan, the terminal transmits a probe signal in order to probe access points in the vicinity of the terminal. Upon receiving the probe signal, the access point sends a response signal comprising various parameters required for accessing the access point, so that the terminal can recognize the access points. Although the terminal can rapidly find the access points by using the active scan, power consumption of the terminal may increase. According to the passive scan, the access points may transmit a beacon signal to a peripheral area thereof every several hundred milliseconds and the terminal receives the beacon signal, thereby recognizing the access points. Since the beacon signal comprises various parameters required for the terminal to access the WLAN, the terminal receiving the beacon signal can access the corresponding access point. Although the terminal employing the passive scan can reduce power consumption as compared with the terminal employing the active scan, the terminal cannot find the access points as rapidly.

In the case of a WLAN according to the IEEE 802.11 standard, it is difficult for the terminal to find the WLAN allowing access to the terminal, and in particular, a WLAN capable of interworking with the mobile communication network. That is, in order to scan all access points when the access points of the WLAN operate in mutually different frequency bands, the terminal must transmit probe signals through various frequency channels (active scan) or the terminal must search various frequency channels to receive the beacon signals of the frequency channels (passive scan). Thus, the time for finding a WLAN may increase. If the terminal continuously performs the scan operation to find a WLAN, power consumption of the terminal may significantly increase.

Therefore, the WLAN can provide an indicator for directing cells to perform the WLAN scanning by using system information broadcasted from the mobile communication network or can provide detailed WLAN information, for example, frequency information, a WLAN identifier: service set identifier (SSID) and the like for the purpose of fast WLAN scan.

Figure 1:
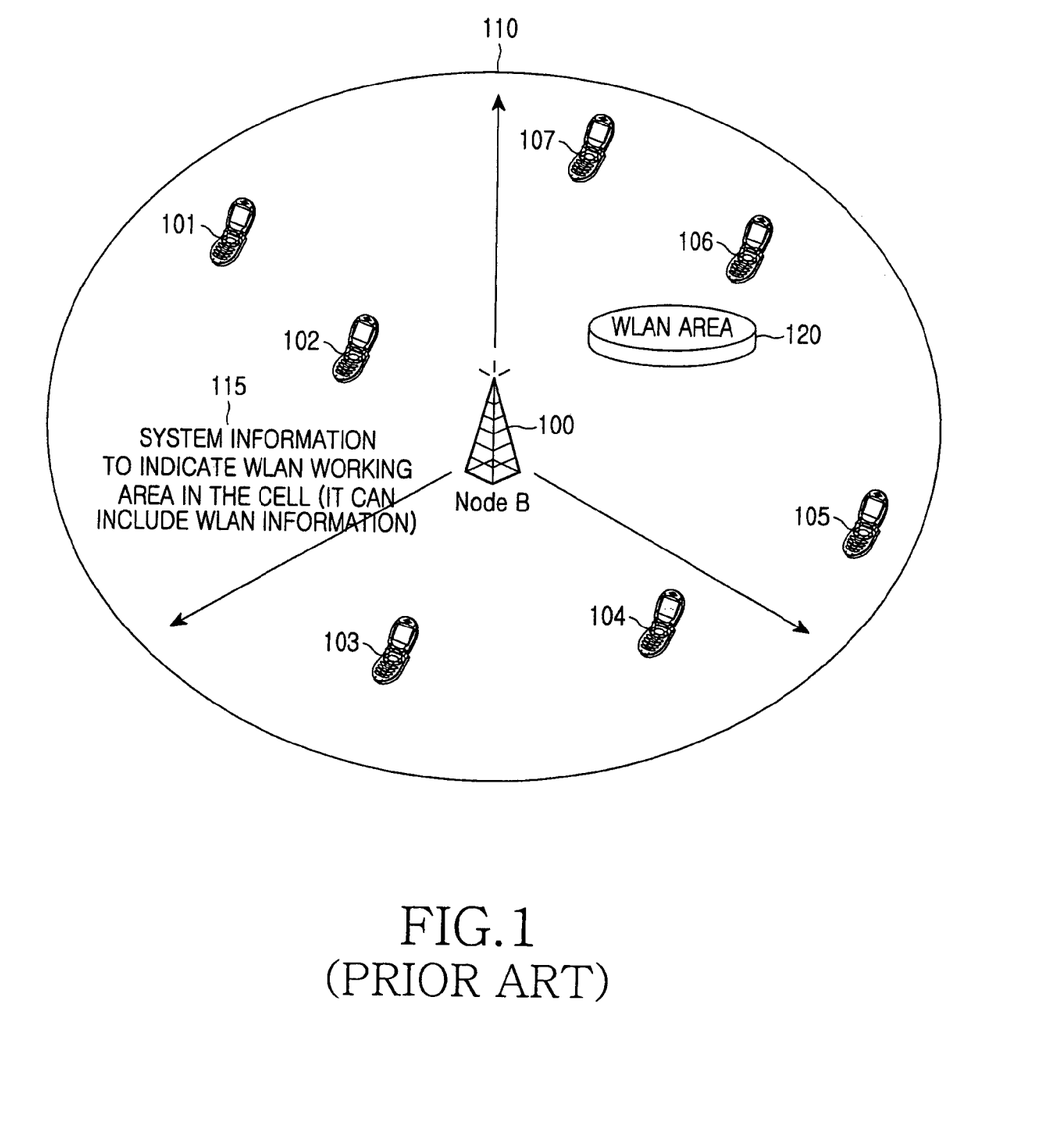
FIG. 1 is a schematic view illustrating WLAN-I in a conventional mobile communication system.

FIG. 1 is a schematic view illustrating WLAN-interworking (WLAN-I) in a conventional mobile communication system.

Referring to FIG. 1, WLAN information 115 is transmitted by using system information broadcasted from a node B 100 provided in a cell 110 comprising a WLAN area 120. Terminals 101 through 107 are WLAN-I terminals. The node B 100 provides the terminals 101 to 107 with the WLAN information 115 indicating that the WLAN area exists in the cell so that the terminals 101 to 107 scan the WLAN and then are handed over to the WLAN area 120.

The WLAN area 120 is significantly smaller than the cell 110 of the mobile communication network. Thus, if the terminals 101 to 105 and 107 except for the terminal 106 adjacent to the WLAN area 120 perform the WLAN scanning, power consumption may unnecessarily increase. This problem may become severe as the size of the WLAN area 120 is reduced relative to the size of the cell 110. In addition, although the WLAN area 120 is concentrated on a hot spot area in the cell, terminals located in other areas also perform the WLAN scan so that power consumption of the terminals may increase. In view of a network, the conventional mobile communication system transmits the WLAN information to the boundary area of the cell, in which the WLAN area 120 is not provided, so that transmission power is unnecessarily wasted.

SUMMARY OF THE INVENTION

Accordingly, the present invention has been made to solve the above-mentioned problems occurring in the prior art, and an object of the present invention is to provide an apparatus and a method capable of effectively transmitting WLAN information to a terminal in a mobile communication system without unnecessarily wasting power consumption in the mobile terminal.

Another object of the present invention is to provide an apparatus and a method for selectively transmitting WLAN-interworking (WLAN-I) information to a WLAN area by taking the direction of the WLAN in a cell and a distance between the WLAN area and a node B into consideration.

Still another object of the present invention is to provide an apparatus and a method for handling a direction of WLAN information transmission by using beam forming and for adjusting a radius of a WLAN area relative to a cell by using a separate code and transmission power different from those used for system information.

In order to accomplish these objects, according to one aspect of the present invention, a method is provided for transmitting wireless local area network (WLAN) information in a mobile communication network for WLAN-interworking. The method comprises the steps of setting a WLAN threshold value for determining if a WLAN area is present in a cell and a measurement period in system information, broadcasting the system information in the cell, and transmitting a common pilot channel, which indicates that the WLAN area is present in the cell, in a predetermined direction with predetermined transmission power to cover the WLAN area by using beam forming.

According to another aspect of the present invention, a method is provided for transmitting wireless local area network (WLAN) information in a mobile communication network for WLAN-interworking. The method comprises the steps of setting a WLAN threshold value for determining if a WLAN area is present in a cell in system information, broadcasting the system information in the cell, and transmitting a common pilot channel, which indicates that the WLAN area is present in the cell, with predetermined transmission power to cover the WLAN area.

According to still another aspect of the present invention, a method is provided for transmitting wireless local area network (WLAN) information in a mobile communication network for WLAN-interworking. The method comprises the steps of determining whether a WLAN area present in a cell has a directional characteristic and a radius characteristic relative to a base station (node B) provided in the cell, setting a WLAN scan indication, which indicates that the WLAN area is present in the cell, in the system information if the WLAN area has no directional characteristic and radius characteristic, and broadcasting the system information in the cell.

According to still yet another aspect of the present invention, a method is provided for transmitting wireless local area network (WLAN) information in a mobile communication network for WLAN-interworking. The method comprises the steps of receiving system information broadcasted in a cell and determining whether the system information includes a WLAN threshold value for determining if a WLAN area is present in the cell, as well as code information and a measurement period of a second common pilot channel, measuring a first common pilot channel and determining whether a measurement result of the first common pilot channel exceeds the WLAN threshold value if the system information includes the WLAN threshold value only, measuring a second common pilot channel and determining whether a measurement result of the second common pilot channel exceeds the WLAN threshold value if the system information comprises all of the code information and the measurement period of the second pilot channel and the WLAN threshold value, and initiating a WLAN scan if the measurement result of the first common pilot channel or the second common pilot channel exceeds the WLAN threshold value.

According to still yet another aspect of the present invention, an apparatus is provided for transceiving wireless local area network (WLAN) information in a mobile communication network for WLAN-interworking. The apparatus comprises a radio network controller for establishing a WLAN threshold value for determining if a WLAN area is present in a cell, and a measurement period in system information, broadcasting the system information in the cell, and transmitting a common pilot channel, which indicates that the WLAN area is present in the cell, in a predetermined direction with predetermined transmission power to cover the WLAN area by using beam forming, and a terminal for receiving the system information, determining whether the system information includes the WLAN threshold value as well as code information and a measurement period of the common pilot channel, measuring the common pilot channel, determining whether a measurement result of the common pilot channel exceeds the WLAN threshold value if the system information includes all of the code information and the measurement period of the second pilot channel and the WLAN threshold value, and initiating a WLAN scan if the measurement result of the common pilot channel exceeds the WLAN threshold value.

According to still yet another aspect of the present invention, an apparatus is provided for transceiving wireless local area network (WLAN) information in a mobile communication network for WLAN-interworking. The apparatus comprises a radio network controller establishing a WLAN threshold value for determining if a WLAN area is present in a cell, in system information, broadcasting the system information in the cell, and transmitting a common pilot channel, which indicates that the WLAN area is present in the cell, in a predetermined direction with predetermined transmission power to cover the WLAN area by using beam forming, and a terminal for receiving the system information, determining whether the system information includes the WLAN threshold value as well as code information and a measurement period of a second common pilot channel, measuring a first common pilot channel for distinguishing the cell, if the system information includes the WLAN threshold value only, determining whether a measurement result of the first common pilot channel exceeds the WLAN threshold value, and initiating a WLAN scan if the measurement result of the first common pilot channel exceeds the WLAN threshold value.

BRIEF DESCRIPTION OF THE DRAWINGS

The above and other objects, features and advantages of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Hereinafter, exemplary embodiments of the present invention will be described with reference to the accompanying drawings. In the following description, a detailed description of known functions and configurations incorporated herein will be omitted for clarity and conciseness. The terms used in the following description are defined by taking functions thereof into consideration, so the terms may vary depending on customs or intentions of a user/administrator. Thus, definitions for the terms must be determined based on the whole contents of the present invention.

Figure 2:
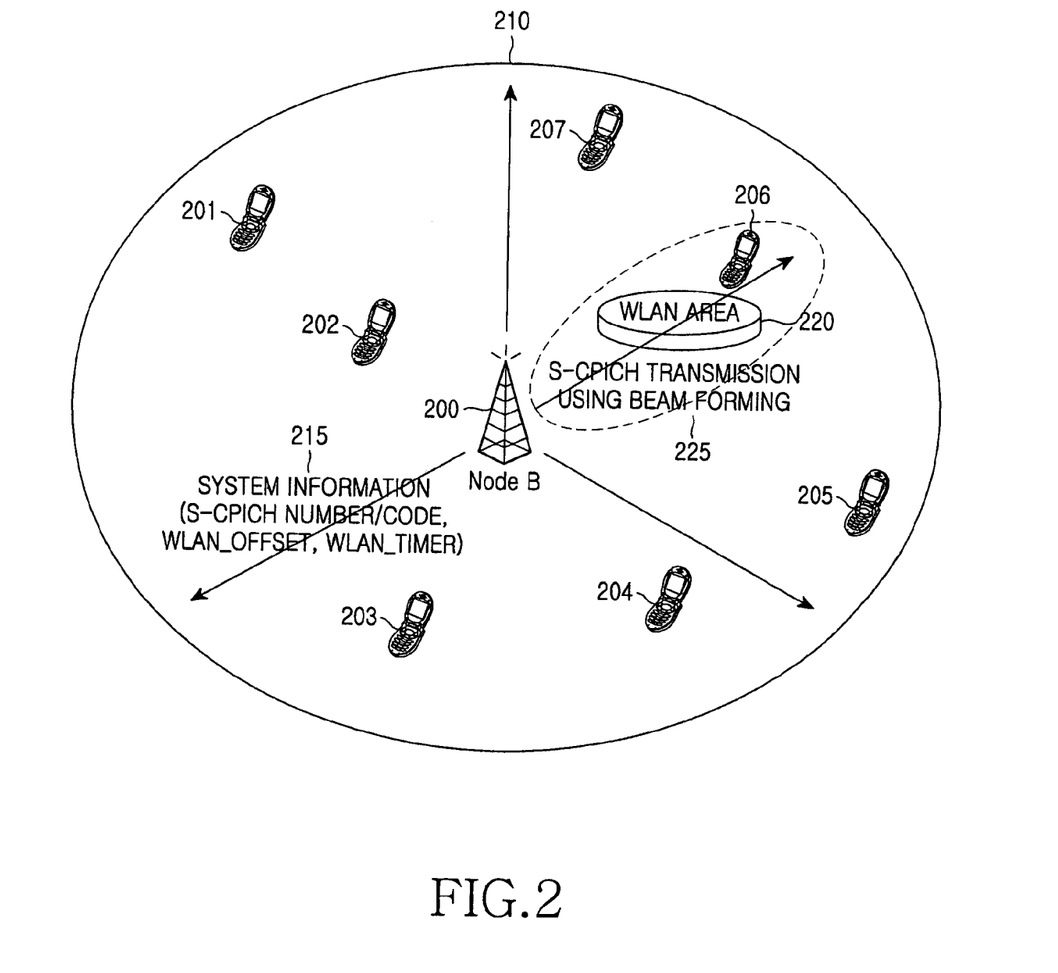
FIG. 2 is a view illustrating WLAN information transmission according to an exemplary embodiment of the present invention.

FIG. 2 is a view illustrating WLAN information transmission according to an exemplary embodiment of the present invention.

Referring to FIG. 2, a WLAN area 220 is located in a cell 210 with a directional characteristic relative to a node B 200.

WLAN-interworking (WLAN-I) information is selectively transmitted to the WLAN area 220 located in the cell 210 by taking the direction of the WLAN area 220 in the cell 210 and the distance between the WLAN area 220 and a node B 200 into consideration.

Terminals 201 through 207 are WLAN-I terminals. The WLAN area 220 is located in a predetermined direction of the cell 210, that is, in a 2 o'clock direction. Accordingly, it is not necessary for the node B 200 to transmit the WLAN information in all directions of the cell 210.

If the node B 200 indicates the terminal 206 of a start of the WLAN scan without detailed WLAN information, for example, frequency information, a WLAN identifier: service set identifier (SSID) and the like, the node B 200 carries a WLAN scan indication, which indicates the start of the WLAN scan, through a secondary common pilot channel (S-CPICH) 225 by using beam forming.

It is not necessary to transmit the S-CPICH 225 to the boundary area of the cell and transmission power for the S-CPICH 225 is determined according to the distance between the WLAN area 220 and the node B 200. The terminal 206 periodically performs the S-CPICH measurement without continuously performing the WLAN scan in the cell. If a sufficient result of the S-CPICH measurement is obtained, the terminal 206 determines that the WLAN scan indication is detected, so the terminal 206 initiates the WLAN scan.

In order to implement the exemplary embodiment of the present invention, a channel code and a scrambling code of the S-CPICH, which may serve as the WLAN scan indication, are transmitted in the cell by using system information 215. According to the current 3GPP standard, a code of spreading factor (SF) is used as the channel code and one of 15 secondary scrambling codes is used as the scrambling code. Thus, in order to allow the terminal 206 to analyze the S-CPICH which serves as the WLAN scan indication and is transmitted to the WLAN area 220 in the cell, the node B 200 indicates the terminal 206 of the channel code and the scrambling code used for the S-CPICH by using the system information 215 broadcasted in the cell. The channel code and the scrambling code may be indicated by using a corresponding index. If a scrambling code different from the above 15 secondary scrambling codes is used, the scrambling code can be directly indicated. In addition, the node B 200 can determine a WLAN_offset value and a WLAN_timer value for the S-CPICH measurement by using the system information 215 in order to allow the terminal 206 to determine if the result of the S-CPICH measurement is sufficient.

In contrast, if the node B 200 indicates the terminal 206 of detailed WLAN information such as frequency information, WLAN identifier (SSID), the WLAN information is transmitted to the WLAN area 220 together with the S-CPICH 225 by using a specific code. At this time, the WLAN information is transmitted to the WLAN area 220 with reduced transmission power by using beam forming. At this time, the system information 215 comprises information related to the channel for transmitting the WLAN information in addition to S-CPICH information. The terminal 206 primarily receives the S-CPICH 225. If reception power for the S-CPICH 225 is sufficient, the terminal 206 receives the WLAN information according to channel information comprised in the system information 215.

In the meantime, it is also possible that the node B 200 indicates the terminal 206 of the detailed WLAN information for the WLAN area 220, which is WLAN frequency information, WLAN identifier (SSID) and the like by using the system information 215 and transmits the WLAN scan indication through the S-CPICH.

Figure 3:
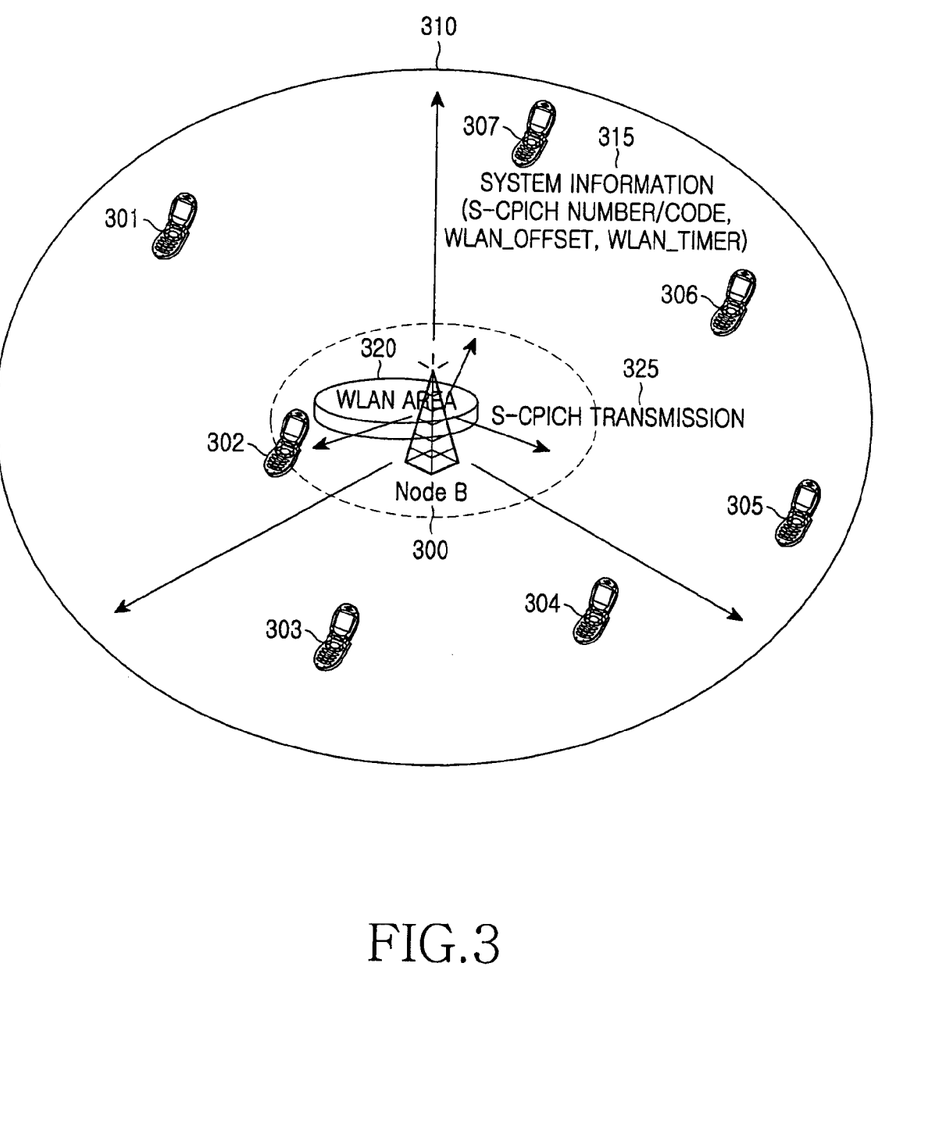
FIG. 3 is a view illustrating WLAN information transmission according to an exemplary embodiment of the present invention.

FIG. 3 is a view illustrating WLAN information transmission according to another exemplary embodiment of the present invention. Referring to FIG. 3, a WLAN area 320 is located in a cell 310 without the directional characteristic relative to a node B 300. The exemplary embodiment of the present invention as shown in FIG. 3 is embodied when the WLAN area 320 is adjacent to the node B 300.

Terminals 301 through 307 are WLAN-I terminals. Since the WLAN area 320 is located in the cell 310 without the directional characteristic relative to the node B 300, the node B may not use the beam forming scheme. In addition, since the WLAN area 320 is located adjacent to the node B 300, if the node B 300 directs the terminals provided in the cell 310 to perform the WLAN scan by using system information 315, the terminals except for the terminal 302 may unnecessarily perform the WLAN scan and waste power. Therefore, the node B 300 does not use the beam forming scheme related to the directional characteristic of the WLAN scan, but may transmit the WLAN scan indication through a S-CPICH 325 with reduced transmission power according to the distance between the WLAN area 320 and the node B 300.

Thus, WLAN-offset and WLAN_timer, which are code information of the S-CPICH which serves as the WLAN scan indication, are transmitted to the terminals 301 through 307 by using the system information 315. Accordingly, the S-CPICH 325 can be transmitted against all directions of the cell 310 with reduced transmission power without using the beam forming scheme. Therefore, the terminals 301 and 303 through 307 may attain insufficient measurement results with respect to the S-CPICH 325, so they do not perform the WLAN scan. If the node B 300 indicates the terminal 302 of the detailed WLAN information, such as frequency information, WLAN identifier (SSID), of the WLAN area 320, the node B 300 may transmits the WLAN information to the WLAN area 220 by using a specific code or by adding the WLAN information to the system information 315.

In the meantime, if the WLAN area 320 does not have directional characteristics relative to the node B 300 as shown in FIG. 3, the node B 300 may allow the terminal 302 to perform the WLAN scan based on the WLAN_offset value without using the S-CPICH while preventing the WLAN scan of other terminals 301 and 303 through 307 remote from the WLAN area 320. At this time, the node B 300 may not separately establish the S-CPICH which serves as the WLAN scan indication, but properly determine the WLAN_offset value and transmit the WLAN_offset value by using the system information 315. In addition, the terminal uses the WLAN_offset value as a threshold value for the measurement result of the P-CPICH, which is a common pilot channel. In addition, the node B 300 transmits the WLAN scan indication or detailed WLAN information by using system information.

Figure 4A:
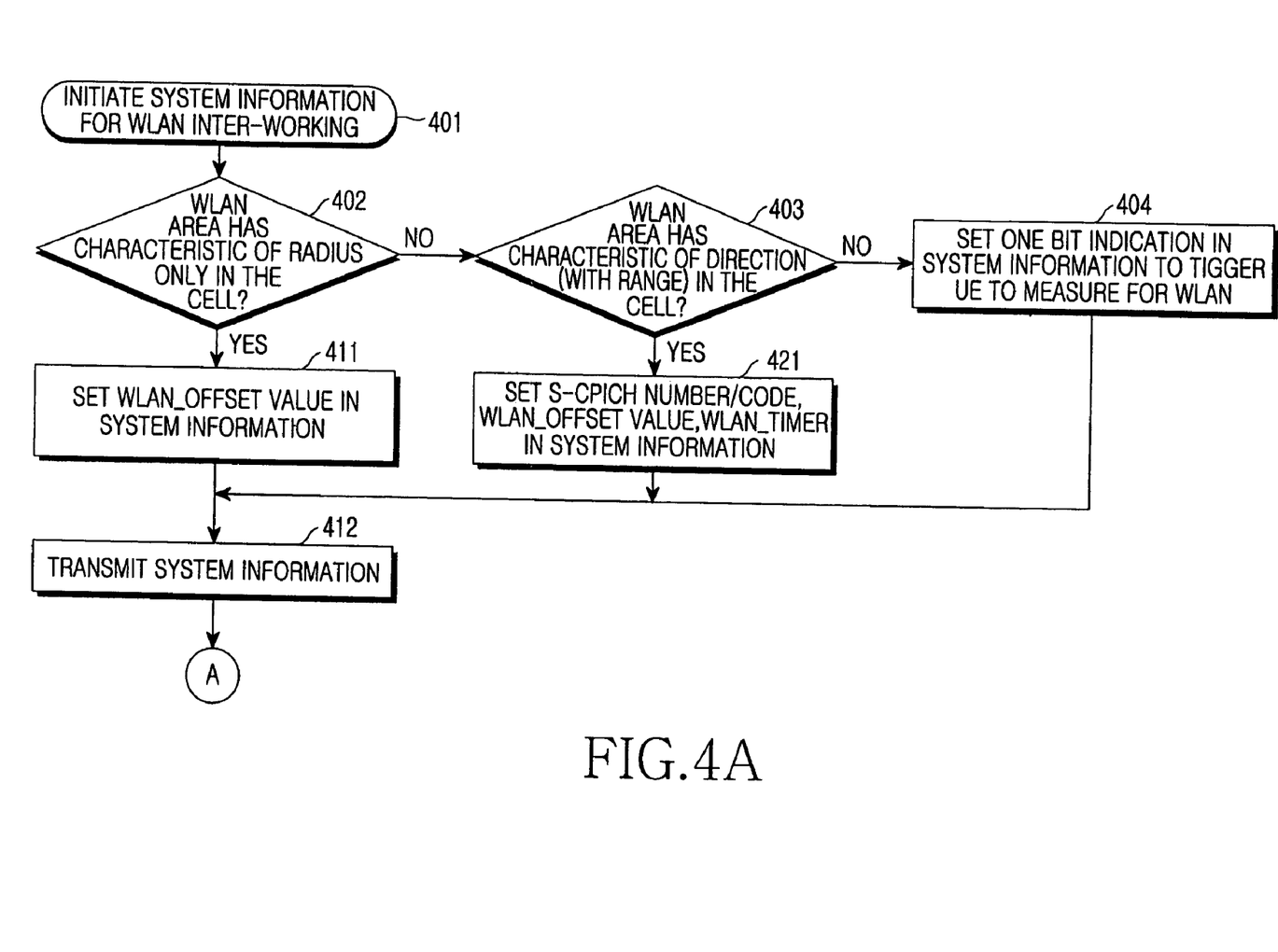
FIGS. 4a and 4b are flowcharts illustrating the procedure of a RNC according to an exemplary embodiment of the present invention.
Figure 4B:
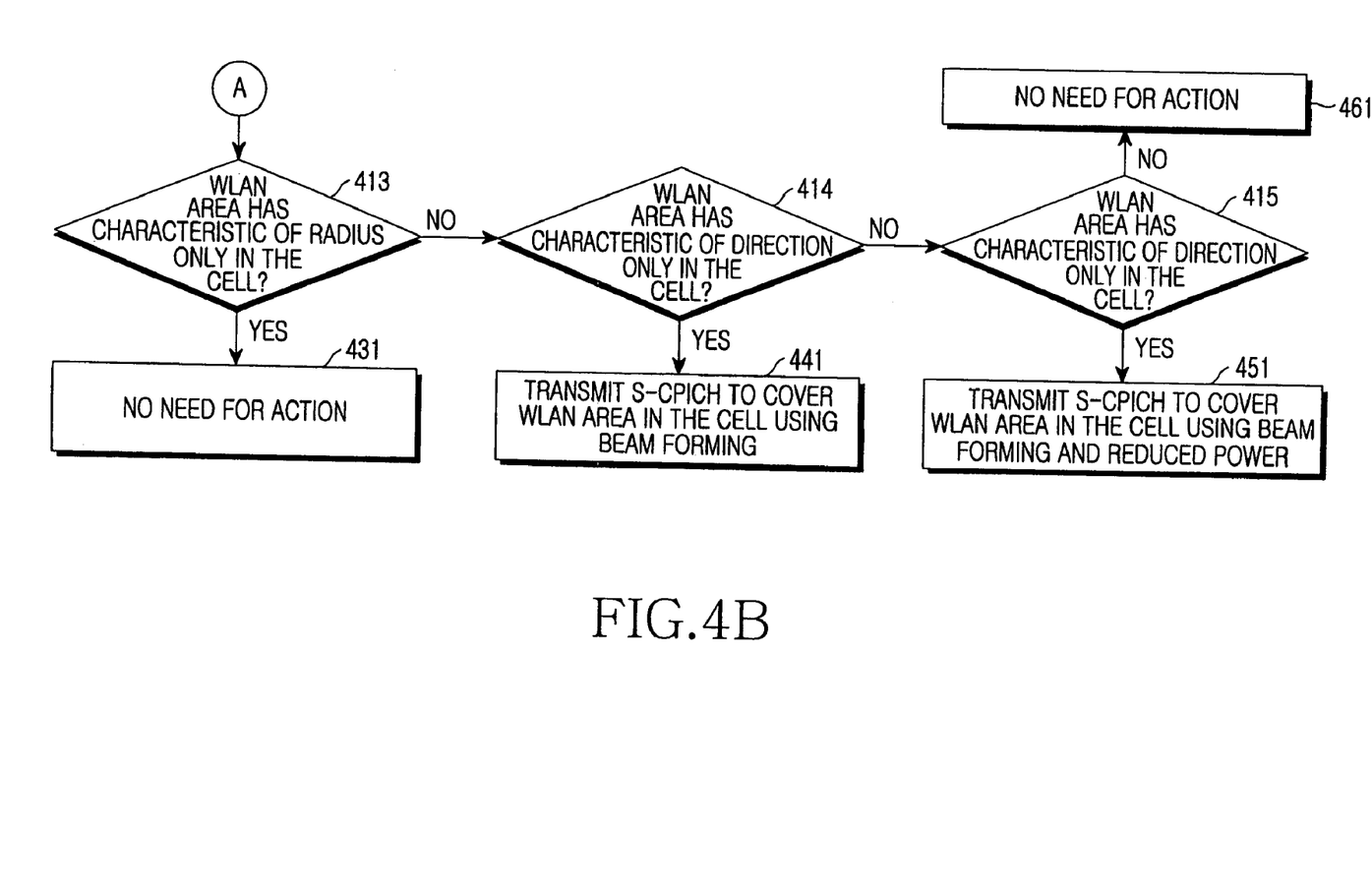

FIGS. 4a and 4b are flowcharts illustrating the procedure of a radio network controller (RNC) according to an exemplary embodiment of the present invention, in which FIG. 4a shows transmission of system information and FIG. 4b shows transmission of a S-CPICH.

Step 401 shown in FIG. 4a represents initialization of WLAN-I. In step 402, the RNC determines whether the WLAN area has a radius characteristic only in the cell without the directional characteristic. If it is determined in step 402 that the WLAN area has the radius characteristic only in the cell, the RNC establishes the WLAN_offset value, which is used as a threshold value of the P-CPICH, in the system information. However, if it is determined in step 402 that the WLAN area does not have radius characteristic only in the cell, step 403 is performed in order to determine if the WLAN area has the directional characteristic.

If it is determined in step 403 that the WLAN area has the directional characteristic, the RNC establishes the S-CPICH for transmitting the WLAN scan indication, WLAN_offset serving as the threshold value of the S-CPICH and WLAN_timer, which is a periodic value for the S-CPICH measurement, in the system information. However, if it is determined in step 403 that the WLAN area does not have directional characteristic in the cell, it indicates that the WLAN area does not have both the radius characteristic and the directional characteristic in the cell. This may happen when a plurality of WLAN areas is irregularly provided in the cell. Thus, the RNC sets the WLAN scan indication in the system information in step 404 and then performs step 412.

In step 412, the system information established in steps 411, 421 and 404 is broadcasted in the cell.

Referring to FIG. 4b, the RNC determines whether the WLAN area has the radius characteristic only in the cell in step 413. If it is determined in step 413 that the WLAN area has the radius characteristic only in the cell, there is no need for action in step 431.

However, if it is determined in step 413 that the WLAN area does not have the radius characteristic only in the cell, step 414 is performed. In step 414, the RNC determines whether the WLAN area has the directional characteristic relative to the node B in the cell. If it is determined in step 414 that the WLAN area has the directional characteristic relative to the node B in the cell, the WLAN scan indication is transmitted through the S-CPICH by using the beam forming to cover the WLAN area in step 441. However, if it is determined in step 414 that the WLAN area has no directional characteristic, step 415 is performed.

In step 415, the RNC determines whether the WLAN area has both the directional characteristic and the radius characteristic in the cell. If it is determined in step 415 that the WLAN area has both the directional characteristic and the radius characteristic in the cell, the WLAN scan indication is transmitted through the S-CPICH by using the beam forming with reduced transmission power to cover the WLAN area in step 451. However, if it is determined in step 415 that the WLAN area has no directional and radius characteristics in the cell, the RNC may not perform an action in step 461.

Figure 5:
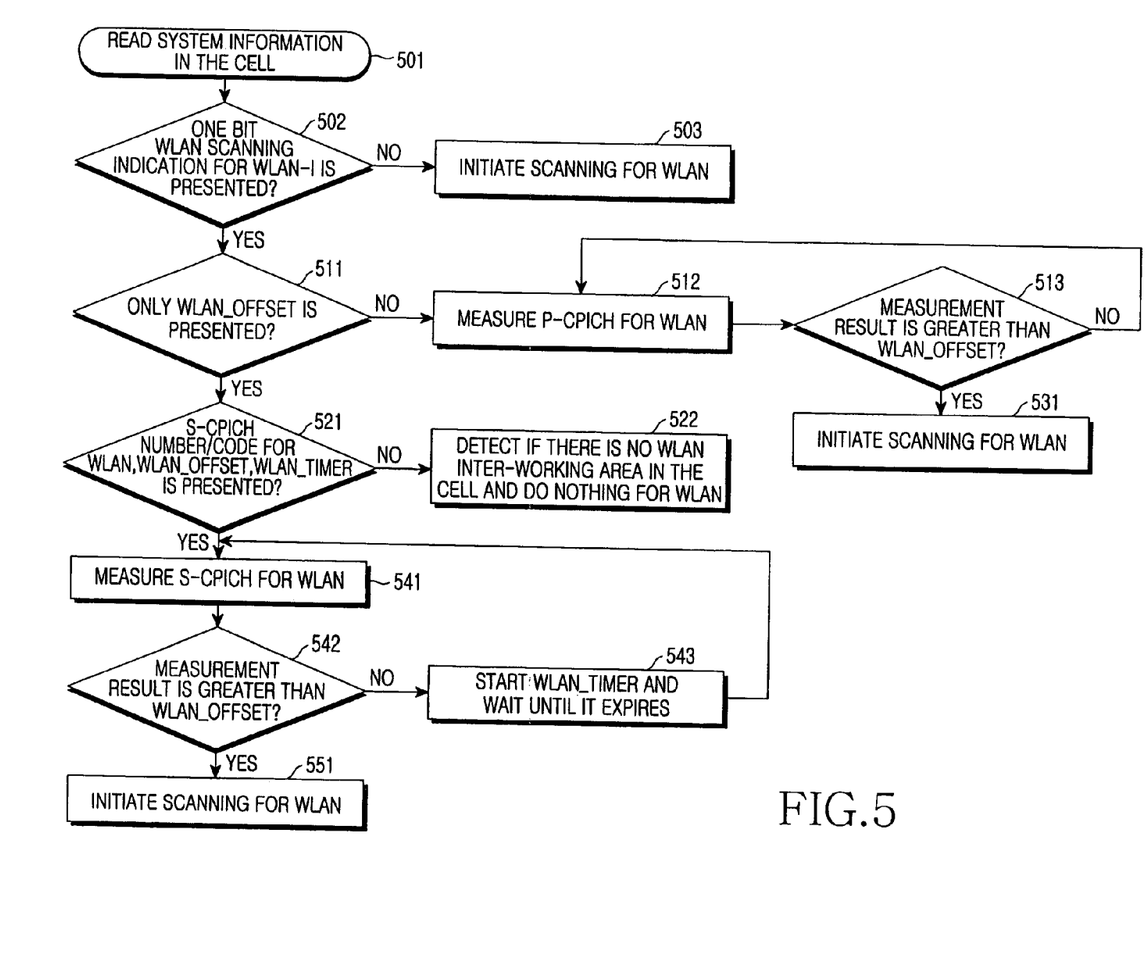
FIG. 5 is a flowchart illustrating the operational procedure of a terminal according to an exemplary embodiment of the present invention.

FIG. 5 is a flowchart illustrating the operational procedure of a terminal according to an exemplary embodiment of the present.

The terminal reads the system information in the cell in step 501 and determines whether the WLAN scan indication is present in the system information in step 502. If the system information comprises the WLAN scan indication, the terminal initiates the WLAN scan in step 503. However, if the system information does not comprise the WLAN scan indication, step 511 is performed in order to determine whether only the WLAN_offset is present in the system information. If the system information includes only the WLAN_offset, the terminal measures the P-CPICH in step 512 and determines whether the measurement result is greater than the WLAN_offset value in step 513. If the measurement result is greater than the WLAN_offset value, the terminal initiates the WLAN scan in step 531. However, if the measurement result is less than the WLAN_offset value, the procedure returns to step 512.

In the meantime, if it is determined in step 511 that the system information does not exclusively have the WLAN_offset, the terminal determines whether the S-CPICH information used as the WLAN scan indication, WLAN_offset information and WLAN_timer information are present in the system information in step 521. If the system information includes all of the S-CPICH information, WLAN_offset information and WLAN_timer information, the terminal measures the S-CPICH in step 541. However, if the system information does not include all of the S-CPICH information, WLAN_offset information and WLAN_timer information, the terminal determines that there is no cell for the WLAN or area for the WLAN-I in step 522.

In addition, the terminal determines whether the measurement result of the S-CPICH is greater than the WLAN_offset value in step 542. If the measurement result of the S-CPICH is greater than the WLAN_offset value, the terminal initiates the WLAN scan in step 551. However, if the measurement results of the S-CPICH is less than the WLAN_offset value, the WLAN_timer starts and the terminal waits for expiration of the WLAN_timer in step 543. Then, the procedure returns to step 541.

As described above, according to the exemplary embodiments of the present invention, the WLAN information is locally transmitted to the area adjacent to the WLAN area by taking the directional characteristic of the WLAN area in the cell and the distance between the WLAN area and the node B into consideration. Thus, the terminals can initiate the WLAN scan with optimized conditions. In addition, in view of the network, it is not necessary to transmit the WLAN information over the whole area of the cell, so transmission power of the terminals can be saved.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for transmitting wireless local area network (WLAN) information in a mobile communication network for WLAN-interworking, the method comprising the steps of:
    determining whether a WLAN area present in a cell has both a radius characteristic and a directional characteristic relative to a base station (node B) provided in the cell;
    establishing a WLAN threshold value for determining if the WLAN area is present in the cell, and a measurement period in system information, the WLAN threshold value allowing a terminal to determine if the result of a common pilot channel measurement is sufficient, if the WLAN area has both the radius characteristic and the directional characteristic;
    broadcasting the system information in the cell; and
    transmitting the common pilot channel, which indicates that the WLAN area is present at the terminal in the cell, in a predetermined direction with predetermined transmission power to cover the WLAN area by using beam forming.

2. The method as claimed in claim 1, wherein the system information comprises:
   code information of the common pilot channel though which a WLAN scanning indication is transmitted and a measurement period of the common pilot channel.

3. The method as claimed in claim 1, wherein the system information comprises:
   detailed information of the WLAN area comprising frequency information and an identifier of the WLAN area and a system identifier.

4. The method as claimed in claim 1, further comprising a step of:
   transmitting detailed information of the WLAN area comprising frequency information and an identifier of the WLAN area and a system identifier in a predetermined direction with predetermined transmission power to cover the WLAN area by using beam forming.

5. The method as claimed in claim 4, wherein the system information comprises:
   code information of a channel for carrying the detailed information of the WLAN area.

6. A method for receiving wireless local area network (WLAN) information in a mobile communication network for WLAN-interworking, the method comprising the steps of:
   determining whether a WLAN area present in a cell has both a radius characteristic and a directional characteristic relative to a base station (node B) provided in the cell;
   receiving system information broadcasted in a cell and determining whether the system information includes a WLAN threshold value for determining if the WLAN area is present in the cell, as well as code information and a measurement period of a second common pilot channel, the WLAN threshold value allowing a terminal to determine if the result of a common pilot channel measurement is sufficient, if the WLAN area has both the radius characteristic and the direction characteristic;
   measuring a first common pilot channel and determining whether a measurement result of the first common pilot channel exceeds the WLAN threshold value if the system information includes the WLAN threshold value only;
   measuring the second common pilot channel and determining whether a measurement result of the second common pilot channel exceeds the WLAN threshold value if the system information includes all of the code information and the measurement period of the second pilot channel and the WLAN threshold value; and
   initiating a WLAN scan if the measurement result of the first common pilot channel or the second common pilot channel exceeds the WLAN threshold value.

7. The method as claimed in claim 6, further comprising the steps of:
   determining whether the system information includes a WLAN scan indication, which indicates that the WLAN area is present in the cell, and
   initiating the WLAN scan if the system information includes the WLAN scan indication.

8. A system for transceiving wireless local area network (WLAN) information in a mobile communication network for WLAN-interworking, the system comprising:
   determining whether a WLAN area present in a cell has both a radius characteristic and a directional characteristic relative to a base station (node B) provided in the cell;
   a radio network controller for establishing a WLAN threshold value which is used for determining if the WLAN area is present in the cell, in system information, the WLAN threshold value allowing a terminal to determine if the result of a common pilot channel measurement is sufficient, if the WLAN area has both the radius characteristic and the directional characteristic;
   broadcasting the system information in the cell, and transmitting the common pilot channel, which indicates that the WLAN area is present at the terminal in the cell, in a predetermined direction with predetermined transmission power to cover the WLAN area by using beam forming; and
   a terminal for receiving the system information, determining whether the system information comprises the WLAN threshold value as well as code information and a measurement period of a second common pilot channel, measuring a first common pilot channel for distinguishing the cell, if the system information comprises the WLAN threshold value only, determining whether a measurement result of the first common pilot channel exceeds the WLAN threshold value, and initiating a WLAN scan if the measurement result of the first common pilot channel exceeds the WLAN threshold value.

9. The system as claimed in claim 8, wherein the terminal determines whether the system information comprises:
   a WLAN scan indication, which indicates that the WLAN area is present in the cell, and initiates the WLAN scan if the system information includes the WLAN scan indication.

10. The system as claimed in claim 8, wherein the system information comprises:
    code information of the common pilot channel through which a WLAN scanning indication is transmitted and a measurement period of the common pilot channel.

11. The system as claimed in claim 8, wherein the system information comprises detailed information of the WLAN area including frequency information and an identifier of the WLAN area and a system identifier.

12. The system as claimed in claim 8, wherein the radio network controller transmits detailed information of the WLAN area including frequency information and an identifier of the WLAN area and a system identifier in a predetermined direction with predetermined transmission power to cover the WLAN area by using beam forming.

13. The system as claimed in claim 12, wherein the system information further comprises:
    code information of a channel carrying the detailed information of the WLAN area.

\* \* \* \* \*